United States Patent
Koga et al.

(10) Patent No.: US 12,047,716 B2
(45) Date of Patent: Jul. 23, 2024

(54) MONITORING CAMERA, CAMERA PARAMETER DETERMINING METHOD AND STORAGE MEDIUM

(71) Applicant: i-PRO CO., LTD., Tokyo (JP)

(72) Inventors: Masashi Koga, Fukuoka (JP); Jun Ikeda, Fukuoka (JP); Satoshi Kawakami, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 0 days.

(21) Appl. No.: 18/135,393

(22) Filed: Apr. 17, 2023

(65) Prior Publication Data
US 2023/0254456 A1    Aug. 10, 2023

Related U.S. Application Data

(62) Division of application No. 17/159,914, filed on Jan. 27, 2021.

(30) Foreign Application Priority Data

Jan. 28, 2020 (JP) .................................. 2020-011726

(51) Int. Cl.
*H04N 7/18* (2006.01)
*G06V 10/141* (2022.01)
(Continued)

(52) U.S. Cl.
CPC ........... *H04N 7/188* (2013.01); *G06V 10/141* (2022.01); *G06V 10/993* (2022.01); *G06V 20/20* (2022.01);
(Continued)

(58) Field of Classification Search
CPC ...... H04N 5/2352; H04N 5/2351; H04N 9/04; H04N 5/23219; H04N 5/23299;
(Continued)

(56) References Cited

U.S. PATENT DOCUMENTS

| 8,477,212 B2 | 7/2013 | Oyabu et al. |
| 9,294,681 B2 | 3/2016 | Murao |

(Continued)

FOREIGN PATENT DOCUMENTS

| JP | 2005-160122 A | 6/2005 |
| JP | 2006-235921 A | 9/2006 |

(Continued)

OTHER PUBLICATIONS

Japanese Office Action issued on Jan. 16, 2024, for Japanese family member Application No. 2020-011726, together with an English translation.

*Primary Examiner* — Hung H Lam
(74) *Attorney, Agent, or Firm* — GREENBLUM & BERNSTEIN, P.L.C.

(57) ABSTRACT

The monitoring camera is capable of performing artificial intelligence, and includes a capturing unit configured to capture an image of the imaging area, a detection unit configured to detect a person in the captured image of the imaging area based on the artificial intelligence, and a controller configured to determine a position of a face of the person in the captured image and determines a camera parameter of the monitoring camera based on a brightness or a moving speed of the face.

11 Claims, 7 Drawing Sheets

(51) Int. Cl.
    *G06V 10/98*     (2022.01)
    *G06V 20/20*     (2022.01)
    *G06V 20/52*     (2022.01)
    *G06V 40/10*     (2022.01)
    *G06V 40/16*     (2022.01)
    *H04N 23/10*     (2023.01)
    *H04N 23/71*     (2023.01)
    *H04N 23/72*     (2023.01)
    *G06V 20/62*     (2022.01)

(52) U.S. Cl.
    CPC .............. *G06V 20/52* (2022.01); *G06V 40/10* (2022.01); *G06V 40/161* (2022.01); *H04N 23/10* (2023.01); *H04N 23/71* (2023.01); *H04N 23/72* (2023.01); *G06V 20/625* (2022.01)

(58) Field of Classification Search
    CPC .. H04N 5/2354; H04N 7/188; H04N 5/23225; G06V 20/20; G06V 20/625; G06V 10/141; G06V 10/993; G06V 20/52; G06V 40/10; G06V 40/161
    See application file for complete search history.

(56) References Cited

U.S. PATENT DOCUMENTS

| | | | |
|---|---|---|---|
| 9,560,363 | B2 | 1/2017 | Nakano et al. |
| 9,779,308 | B2 | 10/2017 | Kuwahara et al. |
| 9,842,409 | B2 | 12/2017 | Kuwahara et al. |
| 10,950,104 | B2 | 3/2021 | Kinoshita et al. |
| 2004/0207743 | A1 | 10/2004 | Nozaki |
| 2006/0215882 | A1 | 9/2006 | Ando et al. |
| 2010/0165382 | A1 | 7/2010 | Asano |
| 2011/0267463 | A1 | 11/2011 | Lee |
| 2011/0304746 | A1 | 12/2011 | Iijima |
| 2013/0050462 | A1 | 2/2013 | Watanabe |
| 2013/0050493 | A1* | 2/2013 | Mitic .................. G08G 1/0175 348/148 |
| 2013/0148846 | A1* | 6/2013 | Maeda ................. G06V 10/141 382/103 |
| 2014/0348399 | A1 | 11/2014 | Kuo |
| 2016/0171312 | A1* | 6/2016 | Aoki ....................... G08G 1/04 382/105 |
| 2016/0344916 | A1 | 11/2016 | Murao |
| 2018/0176461 | A1* | 6/2018 | Venetianer ............. H04N 23/73 |
| 2019/0037118 | A1* | 1/2019 | Oh .......................... H04N 23/71 |
| 2019/0191129 | A1 | 6/2019 | Nakano et al. |
| 2019/0251368 | A1* | 8/2019 | Hutchison ................ G08G 1/04 |
| 2020/0314331 | A1 | 10/2020 | Ouchi |
| 2021/0053489 | A1* | 2/2021 | Golov ........................ G06T 7/70 |
| 2021/0124962 | A1 | 4/2021 | Kim |
| 2022/0368825 | A1 | 11/2022 | Ouchi |

FOREIGN PATENT DOCUMENTS

| | | |
|---|---|---|
| JP | 2006-268135 A | 10/2006 |
| JP | 2009-048261 A | 3/2009 |
| JP | 2009-071521 A | 4/2009 |
| JP | 2010-282390 A | 12/2010 |
| JP | 2014-232971 A | 12/2014 |
| JP | 2015-130615 A | 7/2015 |
| JP | 2019-029833 A | 2/2019 |
| JP | 2019-125258 A | 7/2019 |
| JP | 2019-201344 A | 11/2019 |
| WO | 2016/199192 A1 | 12/2016 |
| WO | WO2019-124056 A1 | 6/2019 |

* cited by examiner

MONITORING CAMERA, CAMERA PARAMETER DETERMINING METHOD AND STORAGE MEDIUM

CROSS REFERENCE TO RELATED APPLICATIONS

This application is a Divisional of U.S. patent application Ser. No. 17/159,914, filed Jan. 27, 2021, which claims priority to Japanese Patent Application No. 2020-011726, filed on Jan. 28, 2020. The disclosure of each of the applications listed above is incorporated by reference herein in its entirety.

BACKGROUND OF THE INVENTION

1. Technical Field

The present invention relates to a monitoring camera and a camera parameter determining method, and a storage medium, for determining a camera parameter of the monitoring camera.

2. Background Art

WO2016/199192 discloses a portable remote monitoring camera equipped with artificial intelligence. The portable remote monitoring camera in the WO2016/199192 is an all-in-one monitoring camera including a Web camera that can capture an image through a dome-shaped windshield, a mobile communication router, a Wi-Fi (registered trademark) communication access point device, and an image analysis function using artificial intelligence.

SUMMARY OF INVENTION

An area imaged by the monitoring camera (hereinafter, referred to as an "imaging area") is often a place where an operator (for example, an owner of a store) of the monitoring camera pays attention in order to monitor the place, such as a place near an automatic door where many persons enter and exit. However, for example, even when an entire image obtained by capturing an image of the imaging area is bright during daytime, a face of a person appearing in the image may be dark due to back light of sunlight, which may deteriorate monitoring accuracy.

In order to improve the monitoring accuracy, the WO2016/199192 discloses a monitoring camera that detects an object to be monitored using artificial intelligence (AI). As described above, when the face of the person appearing in the image captured by the monitoring camera is dark, face detection performance by the artificial intelligence is reduced, which may cause deterioration of monitoring accuracy. The WO2016/199192 does not consider a technical measure to improve image quality when the face of the person appearing in the image is dark. Although the above-described problem is described by taking a person as an example of a subject, the subject is not limited to a person such as a shoplifter, and it is considered that the same applies to a case where the subject is a vehicle to be monitored. The vehicle to be monitored corresponds to, for example, a vehicle that is taken by a shoplifter for escaping.

The present invention is made in view of the above-described circumstances in the related art, and an object of the present invention is to provide a monitoring camera, a camera parameter determining method, and a storage medium to adaptively determine a camera parameter that contributes to improvement of monitoring accuracy of a face of a person appearing in an image of an imaging area, accurately improve image quality of the image, and improve efficiency of a monitoring operation.

The present invention is made in view of the above-described circumstances in the related art, and an object of the present invention is to provide a monitoring camera, a camera parameter determining method, and a storage medium to adaptively determine a camera parameter that contributes to improvement of monitoring accuracy of a feature part of a vehicle appearing in an image of an imaging area, accurately improve image quality of the image, and improve efficiency of a monitoring operation.

The present invention provides a monitoring camera capable of performing artificial intelligence. The monitoring camera includes a capturing unit configured to capture an image of an imaging area, a detection unit configured to detect a person in the captured image of the imaging area based on the artificial intelligence, and a controller configured to determine a position of a face of the person in the captured image and determines a camera parameter of the monitoring camera based on a brightness or a moving speed of the face.

Further, the present invention provides a camera parameter determining method performed by a monitoring camera capable of performing artificial intelligence. The camera parameter determining method includes capturing an image of an imaging area, detecting a person in the captured image of the imaging area based on the artificial intelligence, and determining a position of a face of the person in the captured image and determining a camera parameter of the monitoring camera based on a brightness or a moving speed of the face.

The present invention provides a monitoring camera capable of performing artificial intelligence. The monitoring camera includes a capturing unit configured to capture an image of an imaging area, a detection unit configured to detect a vehicle in the captured image of the imaging area based on the artificial intelligence, and a controller configured to determine a camera parameter of the monitoring camera based on a brightness or a moving speed of the vehicle in the captured image.

Further, the present invention provides a camera parameter determining method performed by a monitoring camera capable of performing artificial intelligence. The camera parameter determining method includes capturing an image of an imaging area, detecting a vehicle in the captured image of the imaging area based on the artificial intelligence, and determining a camera parameter of the monitoring camera based on a brightness or a moving speed of the vehicle in the captured image.

These comprehensive or specific aspects may be implemented by a system, a device, a method, an integrated circuit, a computer storage medium, or a recording medium, or may be implemented by any combination of a system, a device, a method, an integrated circuit, a computer storage medium, and a recording medium.

According to the present invention, a camera parameter that contributes to improvement of monitoring accuracy of a face of a person appearing in an image of an imaging area can be adaptively determined, image quality of the image can be accurately improved, and efficiency of a monitoring operation can be improved.

According to the present invention, a camera parameter that contributes to improvement of monitoring accuracy of a feature part of a vehicle appearing in an image of an imaging area can be adaptively determined, image quality of the image can be accurately improved, and efficiency of a monitoring operation can be improved.

More advantages and effects of an aspect of the present invention will become apparent from the specification and the drawings. These advantages and/or effects are respectively provided by features described in several embodiments, the specification, and the drawings, and it is not necessary to provide all of the advantages and/or effects in order to obtain one or more identical features.

DETAILED DESCRIPTION OF THE EXEMPLARY EMBODIMENT

Hereinafter, embodiments of a monitoring camera, a camera parameter determining method, and a storage medium according to the present invention will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding for those skilled in the art. It should be noted that the accompanying drawings and the following description are provided to enable those skilled in the art to fully understand the present invention, and are not intended to limit the range of the claims.

Figure 1:
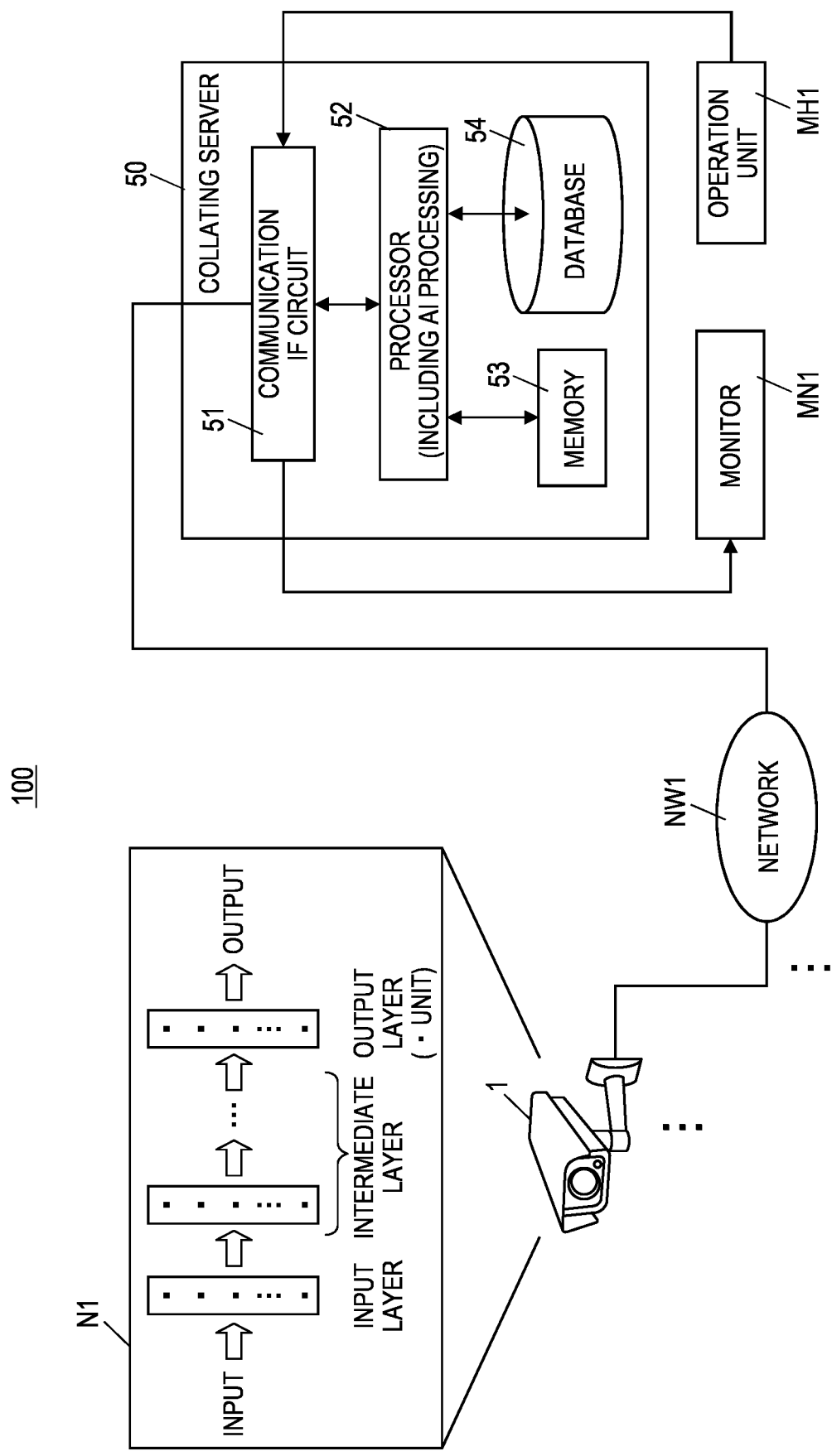
FIG. 1 is a diagram showing a system configuration example of a monitoring camera system according to a first embodiment.

FIG. 1 is a diagram showing a system configuration example of a monitoring camera system 100 according to a first embodiment. As shown in FIG. 1, the monitoring camera system 100 includes a monitoring camera 1, and a collating server 50 to which a monitor MN1 and an operation unit MH1 are connected. The monitoring camera 1 and the collating server 50 are connected to each other via a network NW1 so as to be able to transmit and receive data to and from each other.

The network NW1 is a wireless network conforming to any one of a wireless local area network (LAN) such as Wi-Fi (registered trademark), Bluetooth (registered trademark), and wireless gigabit (WiGig), and is not limited thereto. The network NW1 may be a wired network such as a universal serial bus (USB) cable or a wired LAN. In the following description, an image captured by the monitoring camera 1 (hereinafter referred to as a "captured image") includes not only captured image data but also a camera identification (ID) of the monitoring camera 1 that captures the captured image and information on imaging date and time.

For example, the monitoring camera 1 is installed at various places such as a pole (not shown) installed at a roadside of a road, a parking lot, and a ceiling near an automatic door in a building such as a shop. The monitoring camera 1 captures an image of a subject entering an imaging area within an angle of view of a predetermined width. The monitoring camera 1 is equipped with artificial intelligence (AI), and detects an object from the captured image of the subject using the artificial intelligence. The object is a person, a face of a person, a vehicle, a feature part of a vehicle, and the like. The feature part of a vehicle is a vehicle type, a vehicle color, numbers of a license plate, a vehicle maker emblem, and the like. The vehicle type indicates a body type of a vehicle body such as a minivan, a sedan, and a one box. The object is not limited to a person, a face of a person, a vehicle, and a feature part of a vehicle described above. Alternatively, the object is a moving object in a broad sense such as a motorcycle, a bicycle, a two-wheeled vehicle, a kick scooter, and the like. Further, the object is a feature part of the moving object.

Figure 2:
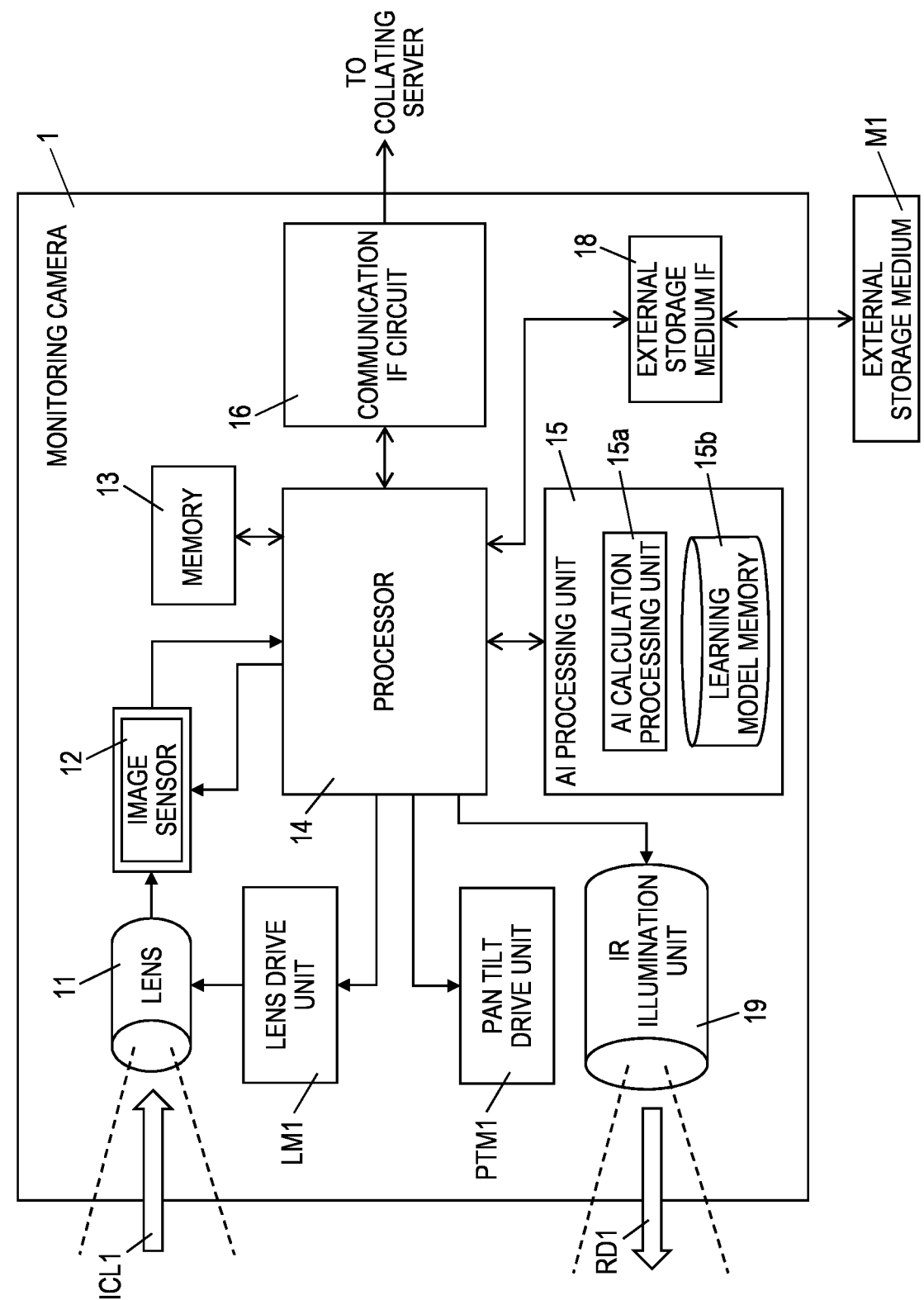
FIG. 2 is a block diagram showing a hardware configuration example of a monitoring camera according to the first embodiment.

In the monitoring camera 1, a learning model is stored in a learning model memory 15b (see FIG. 2). The learning model is a parameter group having a function of the AI installed in the monitoring camera 1. That is, the learning model is a parameter group for determining an object to be detected by the AI installed in the monitoring camera 1. The learning model may be, for example, a parameter group for determining a structure of a neural network N1 of the monitoring camera 1. The parameter group for determining the structure of the neural network N1 of the monitoring camera 1 includes, for example, information or a weighting coefficient indicating a connection relationship among units of the neural network N1. The learning model is generated by a terminal device (not shown) and is stored in the monitoring camera 1 in advance.

The monitoring camera 1 can detect a corresponding object by constructing the neural network N1 corresponding to each object to be detected. For example, the monitoring camera 1 can detect a corresponding object by constructing a neural network for detecting a person, a neural network for detecting a face of a person, a neural network for detecting a vehicle, and a neural network for detecting a feature part of a vehicle. The neural network N1 shown in FIG. 1 is a general term for the four neural networks described above.

For example, when a face of a person is detected, the monitoring camera 1 generates a face cut-out image obtained by cutting out a face from a captured image, and sends a collation instruction including the face cut-out image to the collating server 50 via the network NW1. For example, when numbers of a license plate of a vehicle are character recognized, the monitoring camera 1 sends a collation instruction including a character recognition result of the numbers to the collating server 50 via the network NW1.

The collating server 50 is an information processing device such as a personal computer, a smartphone, a tablet terminal, a server computer machine having high performance specifications, and the like. The collating server 50 executes data communication with the monitoring camera 1 via the network NW1.

The collating server 50 includes a communication IF circuit 51, a processor 52, a memory 53, and a database 54. An interface is simply referred to as "IF" for convenience in the accompanying drawings.

The communication IF circuit 51 executes data communication with the monitoring camera 1 via the network NW1. The communication IF circuit 51 receives, for example, a collation instruction (as described above) sent from the monitoring camera 1 and outputs the collation instruction to the processor 52.

The processor 52 is implemented by a central processing unit (CPU), a digital signal processor (DSP), a graphical processing unit (GPU), a field programmable gate array (FPGA), or the like. The processor 52 functions as a control unit that controls an overall operation of the collating server 50. The processor 52 executes a control processing of controlling an operation of each unit of the collating server 50, a data input and output processing among units of the collating server 50, a data calculation processing, and a data storage processing. The processor 52 is operated according to a program and data stored in the memory 53. The processor 52 uses the memory 53 during an operation, and temporarily stores data or information generated or obtained by the processor 52 in the memory 53.

Based on a collation instruction from the communication IF circuit 51, the processor 52 executes a processing of determining whether the same or similar information with the face cut-out image or the character recognition result of the numbers included in the collation instruction is registered in the database 54 (that is, a collation processing). The processor 52 may execute the collation processing by the AI function using a learning model created for the collation processing. Accordingly, the processor 52 can execute the collation processing with high accuracy. The processor 52 may return a result of the collation processing to the monitoring camera 1 or another external device (for example, a terminal carried by a requester of the collation processing) connected via the network NW1, or may output (display) the result of the collation processing to the monitor MN1. A collation of the face cut-out image sent from the monitoring camera 1 may be executed by the collating server 50 executing the collation processing, or may be executed by visually checking by a person (for example, a system administrator) who uses a receiving terminal (not shown) that received the face cut-out image sent from the monitoring camera 1.

The memory 53 is implemented by a random access memory (RAM), a read only memory (ROM), and the like. The memory 53 temporarily stores a program necessary for executing an operation of the collating server 50, and further temporarily stores data or information generated during the operation. The RAM is, for example, a work memory used in an operation of the collating server 50. The ROM stores in advance, for example, a program for controlling the collating server 50.

The database 54 is implemented by a hard disk drive (HDD), a solid state drive (SDS), or the like. The database 54 stores face blacklist data (not shown) in which a blacklist of faces of persons to be collated is registered or a vehicle number blacklist (not shown) in which a blacklist of numbers of vehicles to be collated is registered.

The monitor MN1 is a display device implemented by a liquid crystal display (LCD), an organic electroluminescence (EL), or the like. The monitor MN1 displays, for example, a result of the collation processing executed by the collating server 50. The monitor MN1 may be provided in the collating server 50.

The operation unit MH1 is an input device that receives an input operation of a user, such as a mouse, a keyboard, a touch pad, and a touch panel. The operation unit MH1 sends a signal corresponding to the input operation of the user to the collating server 50. The operation unit MH1 may be provided in the collating server 50.

FIG. 2 is a block diagram showing a hardware configuration example of the monitoring camera 1 according to the first embodiment. In addition to the monitoring camera 1, FIG. 2 also shows an external storage medium M1 that is inserted into or pulled out from the monitoring camera 1. The external storage medium M1 is a storage medium such as an SD card.

As shown in FIG. 2, the monitoring camera 1 includes a lens 11, a lens drive unit LM1, an image sensor 12, a memory 13, a processor 14, an AI processing unit 15, a communication IF circuit 16, an external storage medium IF 18, an IR illumination unit 19, and a pan tilt drive unit PTM1.

The lens 11 serving as an example of an imaging unit includes, for example, a focus lens and a zoom lens. The lens 11 generates an optical image of a subject on a light receiving surface of the image sensor 12 when an incident light ICL1 which is a light reflected by the subject enters the lens 11. The lens 11 can use lenses of various focal lengths or imaging ranges in accordance with an installation location of the monitoring camera 1, an imaging application, or the like.

The lens drive unit LM1 serving as an example of an imaging unit drives the lens 11 so as to adjust a camera parameter (for example, a position of the focus lens and a position of the zoom lens corresponding to a zoom magnification) related to the lens 11 based on a control signal from the processor 14.

The image sensor 12 serving as an example of an imaging unit sets a camera parameter (for example, exposure time or a gain corresponding to a shutter speed) related to the image sensor 12, and executes a photoelectric conversion to convert the light received on the light receiving surface into an electric signal using the camera parameter. The image sensor 12 is an image sensor such as a charge coupled device (CCD), a complementary metal oxide semiconductor (CMOS), and the like. The image sensor 12 outputs the electric signal (an analog signal) corresponding to the light received on the light receiving surface to the processor 14. The analog signal is converted into captured image data in a digital format by the processor 14 serving as an example of an imaging unit. Accordingly, the captured image data is generated by the processor 14.

The memory 13 is implemented by a RAM, a ROM, and the like. The memory 13 temporarily stores a program necessary for executing an operation of the monitoring camera 1, and further temporarily stores data or information generated during the operation. The RAM is, for example, a work memory used in an operation of the monitoring camera 1. The ROM stores in advance, for example, a program according to the present invention for controlling the monitoring camera 1. In other words, the monitoring camera 1 that is a computer can execute various processes in the camera parameter determining method according to the present invention by the processor 14 executing the program stored in the ROM.

The processor 14 is implemented by a CPU, a DSP, a GPU, an FPGA, and the like. The processor 14 functions as a control unit that controls an overall operation of the monitoring camera 1. The processor 14 executes a control processing of controlling an operation of each unit of the monitoring camera 1, a data input and output processing among units of the monitoring camera 1, a data calculation processing, and a data storage processing. The processor 14 is operated according to a program and data stored in the memory 13. The processor 14 uses the memory 13 during an operation, and temporarily stores data or information generated or obtained by the processor 14 in the memory 13.

The processor 14 serving as an example of an imaging unit generates captured image data in a digital format by executing a predetermined signal processing on the electric signal output from the image sensor 12, and outputs the captured image data to the AI processing unit 15. At this time, the processor 14 may generate the captured image data by adjusting (changing) a camera parameter (for example, a tone curve) related to the signal processing and then executing the signal processing.

The processor 14 includes a timer (not shown). The processor 14 can recognize current time based on an output of the timer, and outputs, to the lit illumination unit 19, a control signal instructing to emit an IR light at night (in other words, from near the sunset to near dawn).

The processor 14 serving as an example of a control unit determines to adjust (change) a camera parameter of the monitoring camera 1 based on a processing result (details will be described later) of the AI processing unit 15. The processor 14 generates a control signal for adjusting (changing) the determined camera parameter, and outputs the control signal to at least one of the lens drive unit LM1, the image sensor 12, a signal processing unit in the processor 14, and the pan tilt drive unit PTM1. For example, when an object (for example, a face of a person) supposed to appear in a captured image cannot be detected by the AI processing unit 15 due to an influence of back light or the like, the processor 14 adjusts (changes) a camera parameter at a current time point so that the AI processing unit 15 can improve detection accuracy of the object (for example, a face of a person).

Here, the camera parameter to be adjusted (changed) includes a camera parameter related to the lens 11 (as described above), a camera parameter related to the image sensor 12 (as described above), a camera parameter related to a signal processing, a camera parameter related to pan rotation or tilt rotation, a camera parameter related to the IR illumination unit 19, and the like. However, it is needless to say that the camera parameter to be adjusted (changed) is not limited to the camera parameters described above. The adjustment (change) of the camera parameter executed by the processor 14 based on the processing result of the AI processing unit 15 will be described in detail later.

The AI processing unit 15 serving as an example of a detection unit detects, using artificial intelligence, an object to be detected based on the captured image data output from the processor 14. The AI processing unit 15 includes a processor such as a CPU, a DSP, a GPU, and an FPGA, and a memory such as a flash memory. The AI processing unit 15 includes an AI calculation processing unit 15a and a learning model memory 15b.

The AI calculation processing unit 15a generates artificial intelligence (AI) based on a learning model stored in the learning model memory 15b. For example, the AI calculation processing unit 15a generates the neural network N1 (see FIG. 1) based on the learning model. The AI calculation processing unit 15a inputs captured image data of a subject generated by the processor 14, and detects an object to be detected from the input captured image data based on the learning model by the neural network N1.

The learning model memory 15b is implemented by a memory such as a RAM, a ROM, and a flash memory. The learning model memory 15b stores a learning model that is created by a learning processing in advance and is used in a detection processing for each object. The AI calculation processing unit 15a can detect an object appearing in a captured image by executing a learning model for each object from the learning model memory 15b and generating a corresponding neural network N1.

The communication IF circuit 16 serving as an example of a communication unit executes data communication (transmission and reception) with the collating server 50 connected via the network NW1. For example, the communication IF circuit 16 sends a collation instruction generated by the processor 14 (for example, a processing of collating a face cut-out image and face blacklist data, or a processing of collating a number character recognition result and number blacklist data) to the collating server 50.

An external storage medium M1 such as an SD card is inserted into or pulled out from the external storage medium IF 18.

The IR illumination unit 19 starts to emit an IR light RD1 having a near-infrared wavelength band toward an imaging area based on a control signal (for example, an instruction to start to emit the IR light) from the processor 14. The IR illumination unit 19 stops emitting the IR light RD1 to the imaging area based on a control signal (for example, an instruction to stop emitting the IR light RD1) from the processor 14. The IR illumination unit 19 increases or reduces an intensity of the currently emitted IR light RD1 based on a control signal (for example, an instruction to adjust an intensity of the IR light RD1) from the processor 14.

Based on a control signal from the processor 14, the pan tilt drive unit PTM1 adjusts a camera parameter (for example, a pan rotation amount or a tilt rotation amount) related to pan rotation or tilt rotation, and executes pan rotation or tilt rotation of the monitoring camera 1 or execute both the pan rotation and the tilt rotation of the monitoring camera 1.

Figure 3:
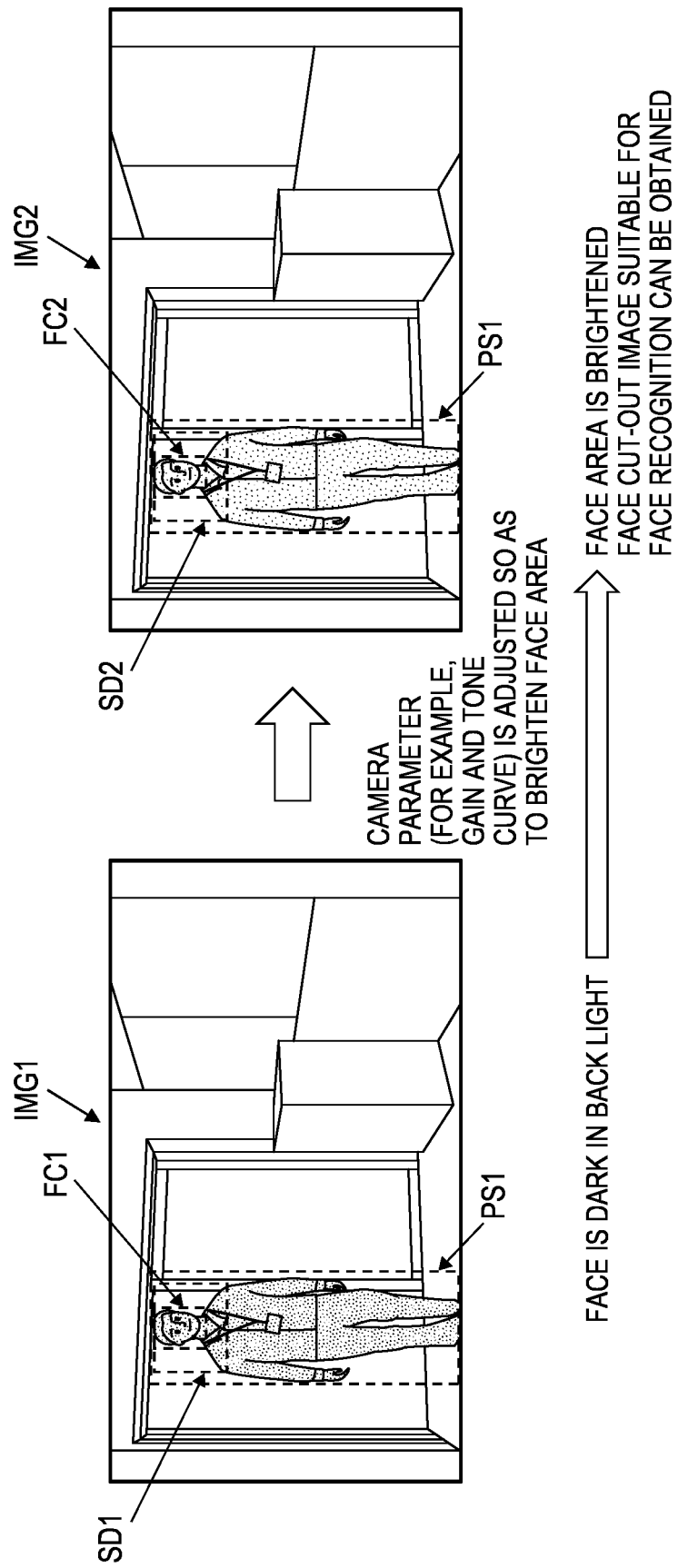
FIG. 3 is a diagram showing a first comparative example of captured images before and after adjustment of a camera parameter in a case where a person is exemplified as a subject.

FIG. 3 is a diagram showing a first comparative example of captured images before and after adjustment of a camera parameter in a case where a person is exemplified as a subject. A captured image IMG1 is an image captured by the monitoring camera 1 using, for example, a person PS1 entering a building as a subject. The monitoring camera 1 can detect an entire frame of the person PS1 or a frame above shoulders SD1 of the person PS1 (that is, a frame above shoulder blades) by an AI processing by using the captured image IMG1 captured based on a camera parameter that is currently set to optimally capture an entire imaging area within an angle of view.

However, in a state where an image is captured under a camera parameter set at a time point when the captured image IMG1 is captured, a face FC1 of the person PS1 is imaged darkly due to an influence of back light such as sunlight. In this case, the face FC1 of the person PS1 cannot be specifically specified, and collation accuracy of the face is reduced. As a result, monitoring accuracy of the imaging area may deteriorate. Even when the face FC1 is imaged darkly, the monitoring camera 1 can obtain brightness information of an area of the face FC1 since the person PS1 in the captured image IMG1 can be detected as described above.

Therefore, in the monitoring camera 1 according to the first embodiment, the processor 14 adjusts (changes) a camera parameter (for example, exposure time and a gain of the image sensor 12, or a tone curve feature) to increase or reduce the camera parameter from a current value by using the brightness information of the area of the face FC1, so that the face area can be imaged brightly. The tone curve is used in a signal processing (for example, generation of captured image data) executed by the processor 14, and indicates a feature defining an output brightness gradation relative to an input brightness gradation. The tone curve feature is stored in the processor 14, the memory 13, or the like.

In a captured image IMG2 captured by the monitoring camera 1 after the adjustment (change), an area of a face FC2 of the same person PS1 is brightened (in other words, a brightness of the face FC2 is increased), and a brightness suitable for a face collation (face recognition) processing by the collating server 50 is obtained. That is, the AI processing unit can detect the face FC2 with a high probability. Therefore, it is expected that accuracy of the face collation executed by the collating server 50 is improved. Further, based on the captured image IMG2 described above, the monitoring camera 1 can improve detection (identification) accuracy of the entire person PS1 appearing in the captured image IMG2 or a frame above shoulders SD2 (for example, not only detection accuracy of a face, but also detection accuracy of details such as gender, age, physiognomy, and clothes). When the brightness of the face FC2 is increased, the AI processing unit 15 can also detect an entire frame of the person PS1 or the frame above shoulders SD2 of the person PS1 (that is, a frame above shoulder blades) in the same manner as the captured image IMG1.

Figure 4:
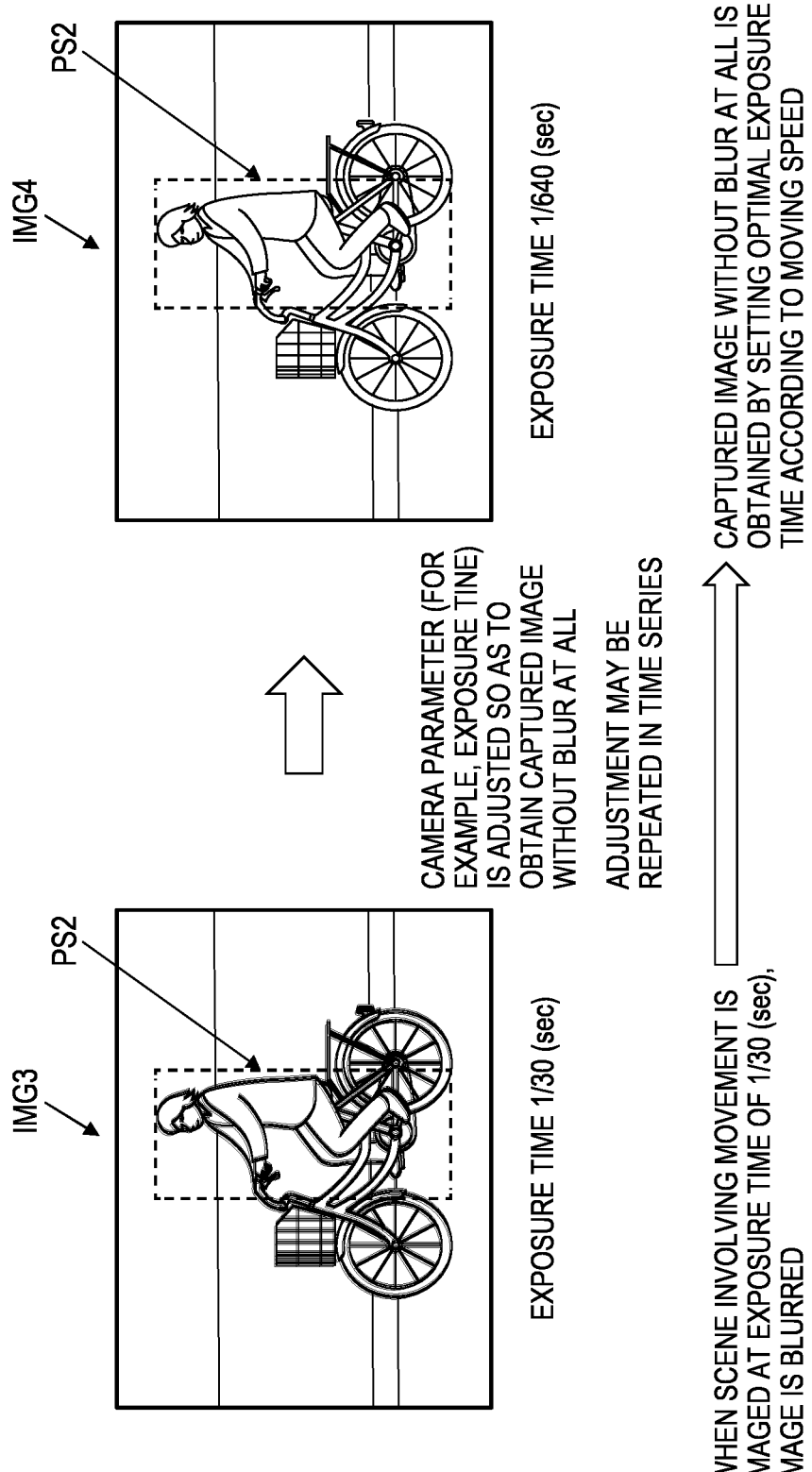
FIG. 4 is a diagram showing a second comparative example of captured images before and after adjustment of a camera parameter in a case where a person is exemplified as a subject.

FIG. 4 is a diagram showing a second comparative example of captured images before and after adjustment of a camera parameter in a case where a person is exemplified as a subject. A captured image IMG3 is an image captured by the monitoring camera 1 using, for example, a person PS2 riding on a bicycle outdoors as a subject. The monitoring camera 1 captures an image based on a camera parameter (for example, exposure time 1/30 [second]) that is currently set to optimally capture an entire imaging area within an angle of view. As a result, as shown in the captured image IMG3, a blur occurs in an image of the person PS2 moving within the angle of view. When a degree of the blur is small, an entire frame of the person PS2 can be detected by an AI processing. However, it is difficult to detect a face of the person PS2 in the image with a blur.

Therefore, in the monitoring camera 1 according to the first embodiment, the processor 14 adjusts (changes) a camera parameter (for example, the exposure time of the image sensor 12) from a current value (for example, 1/30 [second]) to another setting value (for example, 1/640 [second]) by using a moving speed or a moving direction of the person PS2, so that the person PS2 can be imaged without a blur. The adjusted setting value is stored in the processor 14, the memory 13, or the like.

In a captured image IMG4 captured by the monitoring camera 1 after the adjustment (change), since the same person PS2 can be clearly imaged without a blur, a face area of the person PS2 is clear, and an image without a blur suitable for a face collation (face recognition) processing by the collating server 50 is obtained. That is, the AI processing unit 15 can detect the face of the person PS2 with a high probability. When the face of the person PS2 is prevented from being blurred, the AI processing unit 15 can also detect the entire frame of the person PS2 in the same manner as the captured image IMG3.

Figure 5:
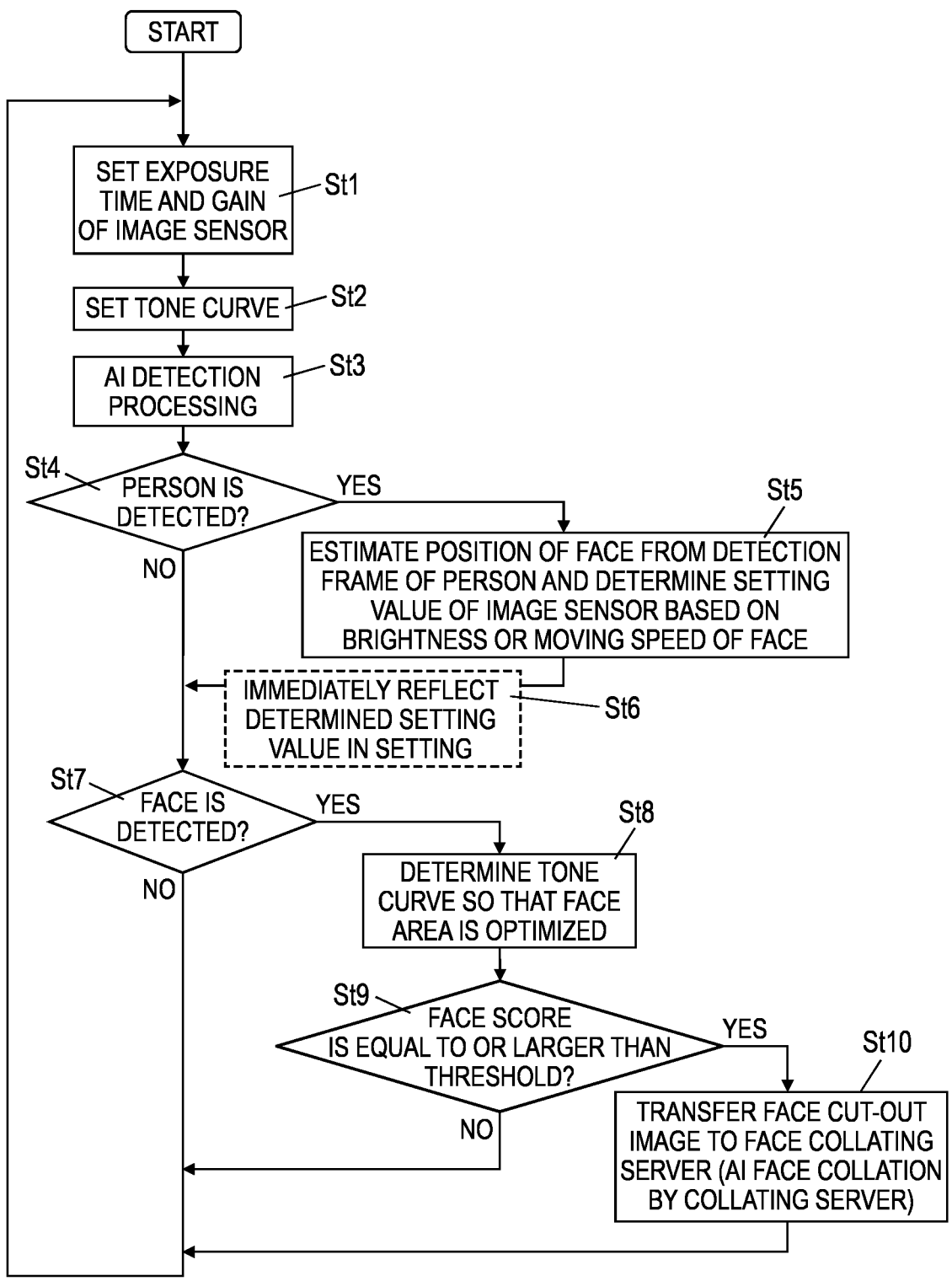
FIG. 5 is a flowchart showing, in time series, a first operation procedure example of the monitoring camera according to the first embodiment.

Next, a first operation procedure example of the monitoring camera 1 according to the first embodiment will be described with reference to FIG. 5. FIG. 5 is a flowchart showing, in time series, the first operation procedure example of the monitoring camera 1 according to the first embodiment. The first operation procedure example is an example in which a subject to be captured by the monitoring camera 1 is a person and a camera parameter is adjusted (changed) so that a face of the person can be detected by the AI processing. Although exposure time and a gain of the image sensor 12 and a tone curve are exemplified as camera parameters to be adjusted (changed) in FIG. 5, it is needless to say that the camera parameter is not limited thereto.

In FIG. 5, as a setting example of the camera parameter, the monitoring camera 1 sets each of the exposure time and the gain of the image sensor 12 to a predetermined value (for example, a predetermined initial value set to enable an entire captured image to be captured brightly) (St1). As an example of the camera parameter, the monitoring camera 1 sets the tone curve having a predetermined feature (for example, a predetermined feature set to enable an entire captured image to be captured brightly) (St2). After the camera parameters are set in steps St1 and St2, the monitoring camera 1 films (images) a subject (for example, the person PS1).

The monitoring camera 1 executes an AI detection processing on captured image data of the subject (for example, the person PS1) (St3). The monitoring camera 1 determines whether the person PS1 (see FIG. 3, for example, an entire image of the person PS1) in the captured image is detected by the AI detection processing (St4). The entire image of the person PS1 may be an entire image specified in accordance with an angle of view from an attachment position of the monitoring camera 1. The entire image of the person PS1 is not limited to a front view of the person PS1, and may be an entire image viewed from a horizontal side, a diagonally forward side, or a diagonally backward side.

When the person PS1 (see FIG. 3) in the captured image is detected (St4, YES), the monitoring camera 1 estimates a position of the face of the person PS1 from a detection frame (that is, a frame indicating a range of the entire detected person PS1 or a range above shoulders) of the person PS1 specified by the detection (St5). Further, the monitoring camera 1 specifies a brightness and a moving speed of the face in the captured image based on the estimated position of the face, and calculates and determines to increase or reduce a setting value (for example, the exposure time and the gain) of the image sensor 12 based on values of the brightness and the moving speed of the face (St5). The determination in step St5 may be executed using only one of the brightness and the moving speed of the face instead of using both the brightness and the moving speed of the face. The monitoring camera 1 may immediately reflect the determined setting value (an example of the camera parameter) in setting of the image sensor 12 (St6). A processing in step St6 is optional and may be omitted. When the processing in step St6 is omitted, the setting value determined in step St5 is reflected in setting of the image sensor 12 at a time point when the step St1 is executed after step St7 which will be described later.

On the other hand, after step St5 (or step St6) or when the person PS1 cannot be detected (St4, NO), the monitoring camera 1 determines whether the face FC2 of the person PS1 (see FIG. 3) in the captured image is detected by the AI detection processing (St7).

When the face FC2 of the person PS1 (see FIG. 3) in the captured image is detected (St7, YES), the monitoring camera 1 determines to reduce a tone curve feature from a current feature so as to optimize the face FC2 in the captured image (for example, so as to have a predetermined brightness suitable for a face collation processing) (St8). That is, even when the face FC2 is detected in the captured image by AI, in a case where a brightness of an area of the face FC2 does not have a predetermined brightness suitable for a collation processing, the tone curve is adjusted (changed) so that the brightness of the area of the face FC2 has the predetermined brightness suitable for a collation processing by using the processing in step St9 to be described later as a filtering function.

After step St8, the monitoring camera 1 determines whether a face score (for example, a probability output value quantitatively indicating a face possibility (face likelihood) of the face area detected in the captured image) related to the detection of the face FC2 by the AI detection processing is equal to or larger than a threshold (St9). The threshold is, for example, a probability output value when a face is detected in a captured image having a brightness suitable for a face collation processing.

When it is determined that the face score at the time of detecting the face FC2 is equal to or larger than the threshold (St9, YES), the monitoring camera 1 generates a face cut-out image in which the area of the face FC2 in the captured image is cut out. The monitoring camera 1 generates a collation instruction including data of the face cut-out image and transfers the data of the face cut-out image to the collating server 50 (St10). Thereafter, the collating server 50 collates the data of the face cut-out image included in the collation instruction transferred from the monitoring camera 1 with the face blacklist data by a face collation by using AI. When the face blacklist data is stored in the monitoring camera 1, the processing of collating the face cut-out image and the face blacklist data may be executed by the monitoring camera 1.

On the other hand, in a case where the face FC2 cannot be detected (St7, NO), or after step St10, or when it is determined that the face score at the time of detecting the face FC2 is less than the threshold (St9, NO), the monitoring camera 1 returns the processing to step St1 and then repeats the processes in steps St1 to St10 as a loop processing. Although the exposure time and the gain of the image sensor 12 and the tone curve are exemplified as an example of camera parameters in FIG. 5, the camera parameters are not limited thereto. For example, the pan rotation or the tilt rotation of the monitoring camera 1, or both the pan rotation and the tilt rotation of the monitoring camera 1 may be executed, a position of a focus lens (that is, an aperture control) and a position of a zoom lens (that is, a zoom magnification control) may be adjusted, and an intensity of the IR light from the IR illumination unit 19 may be adjusted (ON, OFF, and dimming).

As described above, the monitoring camera 1 according to the first embodiment is equipped with artificial intelligence, and includes an imaging unit that captures an image of an imaging area, a detection unit that detects the person PS2 appearing in the captured image of the imaging area, and a control unit that estimates a position of a face of a person in the captured image and determines a camera parameter of the monitoring camera 1 based on a brightness or a moving speed of the face.

Accordingly, even in an environment where the face of the person PS1 appearing in the image of the imaging area is dark due to the influence of back light of sunlight or the like, or in a moving scene where a person rides on a moving object such as a bicycle or a motorcycle, the monitoring camera 1 can adaptively determine a camera parameter that contributes to improvement of monitoring accuracy of the imaging area, so that detection accuracy of an object to be detected in a captured image by artificial intelligence (AI) can be improved. Therefore, the monitoring camera 1 can accurately improve image quality of a captured image of the person PS1, and can improve efficiency of a monitoring operation in the imaging area, such as the detection of the face of the person PS1.

The monitoring camera 1 sets a determined camera parameter. Accordingly, the monitoring camera 1 can quickly improve detection accuracy of an object (for example, the face of the person PS1) to be detected by AI, so that the object (for example, the face of the person PS1) to be detected in the captured image can be detected with high accuracy.

When the person PS1 in the captured image cannot be detected, the monitoring camera 1 determines and sets a camera parameter so that the person PS1 appearing in the captured image captured by the imaging unit can be detected by AI. Accordingly, when the monitoring camera 1 is installed in an environment where AI cannot detect the person PS1 at a currently set camera parameter, the monitoring camera 1 can adjust (change) the camera parameter so that at least the person PS1 can be detected.

The camera parameter is exposure time of the imaging unit. The monitoring camera 1 determines the exposure time so that the face of the person PS1 appearing in the captured image captured by the imaging unit can be detected by AI (for example, so as to have a brightness or a degree of blur suitable for a face collation). Accordingly, the monitoring camera 1 brighten a captured image obtained by the image sensor 12 and accurately improves image quality of a feature part (for example, a face) of a subject, so that the monitoring camera 1 can improve the detection accuracy of the face of the person by AI, and can generate, with high accuracy, a face cut-out image having a brightness or a degree of blur to an extent that can be used in a collation processing executed by the collating server 50 using the face blacklist data.

The camera parameter is a gain of the imaging unit. The monitoring camera 1 determines the gain so that the face of the person appearing in the captured image captured by the imaging unit can be detected by AI (for example, so as to have a brightness or a degree of blur suitable for a face collation). Accordingly, the monitoring camera 1 relatively increases a brightness of a captured image obtained by the image sensor 12 and accurately improves image quality of a feature part (for example, a face) of a subject, so that the monitoring camera 1 can improve the detection accuracy of the face of the person by AI, and can generate, with high accuracy, a face cut-out image having a brightness or a degree of blur to an extent that can be used in a collation processing executed by the collating server 50 using the face blacklist data.

The camera parameter is a tone curve used to generate a captured image. The monitoring camera 1 determines the tone curve so that the face of the person PS1 appearing in the captured image captured by the imaging unit can be detected by AI (for example, so as to have a brightness or a degree of blur suitable for a face collation). Accordingly, the monitoring camera 1 relatively increases a brightness of a captured image generated by the processor 14 and accurately improves image quality of a feature part (for example, a face) of a subject, so that the monitoring camera 1 can improve the detection accuracy of the face of the person by AI, and can generate, with high accuracy, a face cut-out image having a brightness or a degree of blur to an extent that can be used in a collation processing executed by the collating server 50 using the face blacklist data.

The camera parameter is a rotation amount of at least one of pan rotation and tilt rotation of the imaging unit. The monitoring camera 1 determines the rotation amount so that the face of the person PS1 appearing in the captured image captured by the imaging unit can be detected by AI. Accordingly, the monitoring camera 1 can appropriately include the face of the person in an angle of view and can accurately improve the detection accuracy of the face of the person by AI. Further, the monitoring camera 1 can generate, with high accuracy, a face cut-out image having a resolution to an extent that can be used in a collation processing executed by the collating server 50 using the face blacklist data.

The camera parameter is a zoom magnification of the imaging unit. The monitoring camera 1 determines the zoom magnification so that the face of the person PS1 appearing in the captured image captured by the imaging unit can be detected by AI. Accordingly, even when a proportion of the face of the person PS1 in the captured image is small, the monitoring camera 1 can detect the face of the person with high accuracy by AI by increasing the zoom magnification and zooming up. Further, the monitoring camera 1 can generate, with high accuracy, a face cut-out image having a resolution to an extent that can be used in a collation processing executed by the collating server 50 using the face blacklist data.

After a camera parameter is set, when the face of the person in the captured image captured by the imaging unit is detected by AI and a detection score of the face (for example, a face score) is equal to or larger than a threshold, the monitoring camera 1 sends the face cut-out image obtained by cutting out the face from the captured image to a face collating server (for example, the collating server 50) communicably connected with the monitoring camera 1. Accordingly, the monitoring camera 1 can generate a face cut-out image obtained by cutting out the face of the person entering the imaging area, and can request the collating server 50 to determine whether the face in the face cut-out image is a face of a suspicious person registered in the face blacklist data. Therefore, monitoring accuracy of the imaging area is accurately improved.

Figure 6:
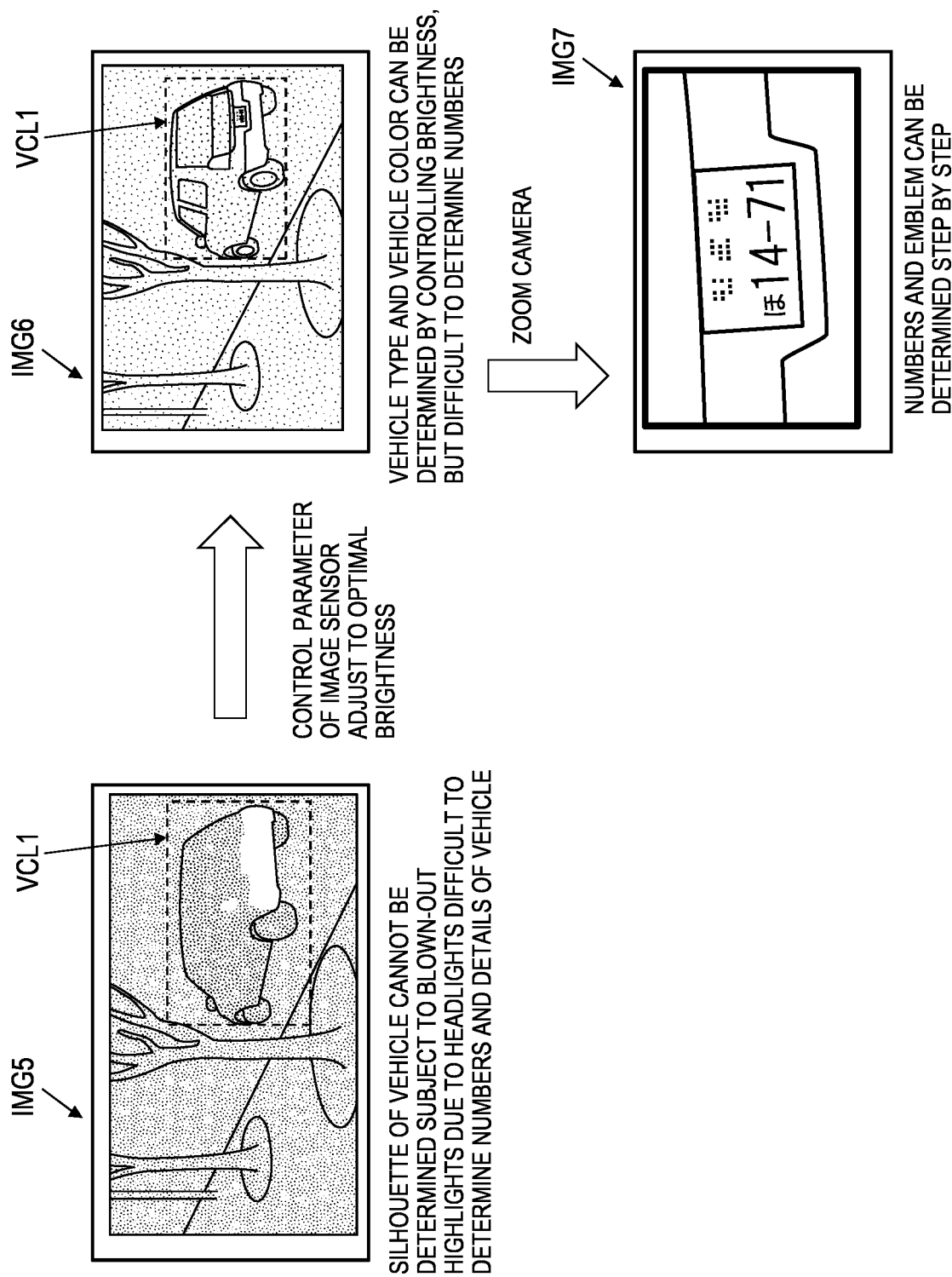
FIG. 6 is a diagram showing a comparative example of captured images before and after adjustment of a camera parameter in a case where a vehicle is exemplified as a subject.

FIG. 6 is a diagram showing a comparative example of captured images before and after adjustment of a camera parameter in a case where a vehicle is exemplified as a subject. For example, a captured image IMG5 is an image captured at night by the monitoring camera 1 installed on a roadside using a vehicle VCL1 entering an imaging area as a subject. The monitoring camera 1 can detect a silhouette of the vehicle VCL1 (that is, a vague entire frame) by the AI processing using the captured image IMG5 captured based on a camera parameter that is currently set to optimally capture an entire imaging area within an angle of view.

However, in a state where the captured image IMG5 is captured under a camera parameter set at a time point when the captured image IMG5 is captured, a license plate at a rear side of the vehicle VCL1 and a surrounding of the license plate are subject to blown-out highlights due to an influence of headlights of a following vehicle, headlights of an oncoming vehicle, headlights of the vehicle VCL1, or the like at night, or the vehicle VCL1 during traveling is captured with a blur. Accordingly, it may be difficult to detect the numbers and details of the vehicle VCL1 by AI. In such a case, even when a vehicle type and a vehicle color of the vehicle can be recognized by human eyes, feature parts unique to the vehicle VCL1 such as the numbers, the vehicle type, and the vehicle color of the vehicle VCL1 cannot be detected with high accuracy by the AI processing in the monitoring camera 1, and monitoring accuracy of the imaging area is likely to deteriorate.

Therefore, in the monitoring camera 1 according to the first embodiment, the processor 14 adjusts (changes) a camera parameter (for example, exposure time and a gain of the image sensor 12 or a tone curve feature) to increase or reduce the camera parameter from a current value, so that an external appearance feature part of the entire vehicle VCL1 can be firstly imaged with high accuracy in preference to a feature part of a fairly detailed part such as the numbers. The adjusted camera parameter is set in the image sensor 12, or stored in the processor 14 or the memory 13.

In a captured image IMG6 captured by the monitoring camera 1 whose camera parameter was adjusted, an area of an entire external appearance (an outer shape) of the same vehicle VCL1 is brightened. Based on the captured image IMG6, the monitoring camera 1 can determine a vehicle type (for example, a minivan) and a vehicle color (for example, pink) of the vehicle VCL1 as an external appearance feature part of the vehicle VCL1 by the AI processing. That is, the AI processing unit 15 can detect the vehicle type and the vehicle color of the vehicle VCL1 with a high probability.

Next, the processor 14 adjusts (changes) a camera parameter (for example, a position of the zoom lens corresponding to a zoom magnification) to increase the camera parameter from a current value, so that a partial feature part such as the license plate or the emblem (here, the license plate is taken as an example) of the vehicle VCL1 can be imaged with high accuracy. The adjusted camera parameter is stored in the lens drive unit LM1, the processor 14, or the memory 13. Accordingly, compared with the time point when the captured image IMG 6 is captured, the monitoring camera 1 can capture an image after executing a zoom up processing, so that the license plate of the vehicle VCL1 is located at the center of the captured image.

In a captured image IMG7 captured by the monitoring camera 1 after the zoom up processing, an area of the license plate of the same vehicle VCL1 is brightened and enlarged. Based on the captured image IMG7, the monitoring camera 1 can determine the license plate (for example, Shinagawa 306, HO 14-71) of the vehicle VCL1, serving as a partial feature part of the vehicle VCL1 by AI. That is, the AI processing unit 15 can detect the numbers of the vehicle VCL1 with a high probability step by step after detecting the vehicle type and the vehicle color of the vehicle VCL1.

Figure 7:
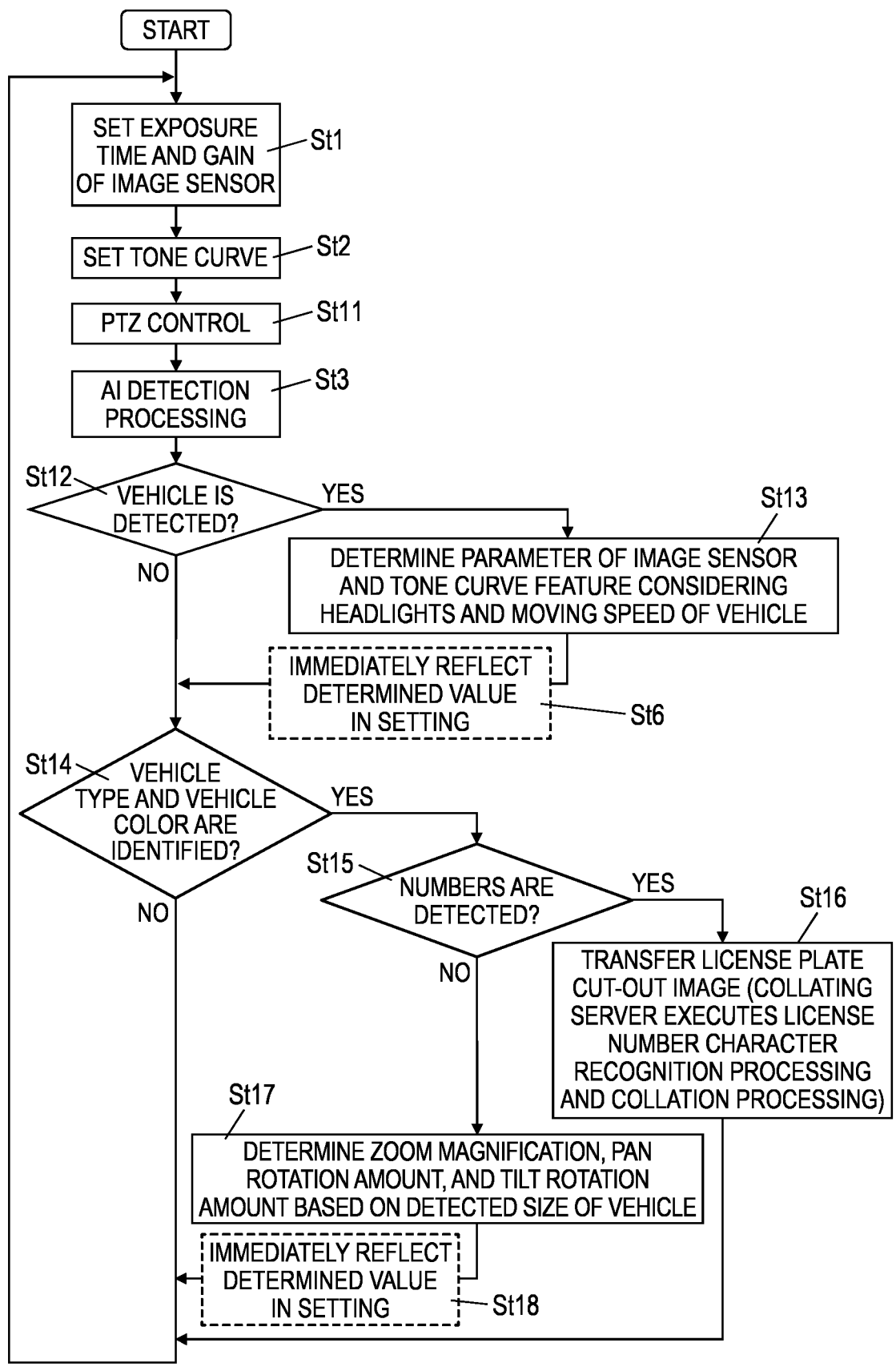
FIG. 7 is a flowchart showing, in time series, a second operation procedure example of the monitoring camera according to the first embodiment.

Next, a second operation procedure example of the monitoring camera 1 according to the first embodiment will be described with reference to FIG. 7. FIG. 7 is a flowchart showing, in time series, the second operation procedure example of the monitoring camera 1 according to the first embodiment. The second operation procedure example is an example in which a subject to be captured by the monitoring camera 1 is a vehicle and a camera parameter is adjusted (changed), so that a feature part of the vehicle (for example, in order of the vehicle type and the vehicle color, and the numbers) can be detected step by step by the AI processing. Although exposure time and a gain of the image sensor 12, a tone curve, a pan rotation amount, a tilt rotation amount, and a position of the zoom lens (in other words, a zoom magnification) are exemplified as camera parameters to be adjusted (changed) in FIG. 7, it is needless to say that the camera parameter is not limited thereto. In FIG. 7, the same processing as that in FIG. is denoted by the same step number, a description of the same processing will be simplified or omitted, and different contents will be described.

In FIG. 7, after steps St1 and St2, the monitoring camera 1 executes a pan tilt zoom (PTZ) control to reflect at least one setting of the pan rotation amount, the tilt rotation amount, and the zoom magnification as a setting example of the camera parameter (St11). After the camera parameters are set in steps St1, St2, and St11, the monitoring camera 1 films (images) a subject (for example, the vehicle VCL1). A processing in step St11 may be optional. The monitoring camera 1 may not necessarily execute the PTZ control, and may execute the PTZ control when a camera parameter related to the PTZ control is changed.

The monitoring camera 1 executes an AI detection processing on captured image data of the subject (for example, the vehicle VCL1) (St3). The monitoring camera 1 determines whether the vehicle VCL1 (see FIG. 6, for example, an entire image of the vehicle VCL1 or a part of the vehicle VCL1) in the captured image is detected by the AI detection processing (St12). The entire image of the vehicle VCL1 may be an entire image or a partial image specified in accordance with an angle of view from an attachment position of the monitoring camera 1. The entire image of the vehicle VCL1 is not limited to a front view of the vehicle VCL1, and may be an entire image or a partial image viewed from a horizontal side, a diagonally forward side, or a diagonally backward side.

When the vehicle VCL1 (see FIG. 6) in the captured image is detected (St12, YES), the monitoring camera 1 calculates and determines to increase or reduce a setting value (for example, the exposure time and the gain) of the image sensor 12 based on whether headlights of the vehicle VCL1 in the captured image are turned on and a brightness of a headlight part or based on a moving speed of the vehicle VCL1 (St13). The monitoring camera 1 may immediately reflect the determined setting value (an example of the camera parameter) in setting of the image sensor 12 (St6). A processing in step St6 is optional and may be omitted. When the processing in step St6 is omitted, the setting value determined in step St12 is reflected in setting of the image sensor 12 at a time point when the step St1 is executed after step St14 which will be described later.

On the other hand, after step St13 (or step St6) or when the vehicle VCL1 cannot be detected (St12, NO), the monitoring camera 1 determines whether the vehicle type and the vehicle color of the vehicle VCL 1 (see FIG. 6) in the captured image can be identified by the AI detection processing (St14). Although the monitoring camera 1 determines whether the vehicle type and the vehicle color can be identified in step St14, the monitoring camera 1 may determine whether the vehicle type or the vehicle color can be identified.

When the vehicle type and the vehicle color of the vehicle VCL1 (see FIG. 6) in the captured image are identified (St14, YES), the monitoring camera 1 determines whether a license plate can be detected by the AI detection processing (an identification processing) (St15).

When the numbers of the vehicle VCL1 is detected (St15, YES), the monitoring camera 1 generates a number cut-out image obtained by cutting out the number part in the captured image. The monitoring camera 1 generates a collation instruction including the number cut-out image and transfers the collation instruction to the collating server 50 (St16). Thereafter, the collating server 50 executes a character recognition processing using AI, and collates data of the number cut-out image and the number blacklist data. At least one of the character recognition processing and the collation processing may be executed by the monitoring camera 1 (for example, the processor 14 serving as an example of a character recognition unit and a collating unit).

On the other hand, when the numbers of the vehicle VCL1 cannot be detected (St15, NO), the monitoring camera 1 calculates the zoom magnification of the lens, the pan rotation amount, or the tilt rotation amount based on a detected size of the vehicle VCL1 so as to increase a size of the license plate in the image to a size suitable for number recognition (St17). The monitoring camera 1 may immediately reflect the determined setting value in a PTZ control (St18). A processing in step St18 is optional and may be omitted. When the processing in step St18 is omitted, the setting value determined in step St17 is reflected in setting of the lens drive unit LM1 and the pan tilt drive unit PTM1 at a time point when the step St11 is executed after step St17 which will be described later. It is expected to improve a detection probability of the license plate for a frame of the captured image captured and input after the license plate part is zoomed up.

After step St16, or after step St17 (or after step St18), or when it is determined that neither the vehicle type nor the vehicle color is detected (St14, NO), the monitoring camera 1 returns the processing to step St1 and then repeats the processes in steps St1 to St18 as a loop processing. Although the exposure time and the gain of the image sensor 12, the tone curve, the pan rotation amount, the tilt rotation amount, and the position of the zoom lens are exemplified as an example of the camera parameter in FIG. 7, the camera parameter is not limited thereto. Alternatively, for example, a position of a focus lens (that is, an aperture control) and an intensity of the IR light from the IR illumination unit 19 may be adjusted (ON, OFF, and dimming).

As described above, the monitoring camera 1 according to the first embodiment is equipped with artificial intelligence, and includes an imaging unit that captures an image of an imaging area, a detection unit that detects the vehicle VCL1 appearing in the captured image of the imaging area, and a control unit that determines a camera parameter of the monitoring camera 1 based on a brightness (for example, whether headlights are turned on, and a brightness of a headlight part when the headlights are turned on) or a moving speed of the vehicle VCL1 in the captured image.

Accordingly, even in an environment where a feature part of the vehicle VCL1 appearing in the image of the imaging area is dark due to an influence of headlights of a following vehicle, headlights of an oncoming vehicle, headlights of the vehicle VCL1, or the like at night, or in an environment where a blur occurs in the captured image of the vehicle due to a movement, the monitoring camera 1 can adaptively determine a camera parameter that contributes to improvement of monitoring accuracy of the imaging area, so that detection accuracy of an object to be detected in the captured image by the artificial intelligence (AI) can be improved. Therefore, the monitoring camera 1 can accurately improve image quality of the captured image of the vehicle VCL1, and can improve efficiency of a monitoring operation in the imaging area, such as the detection of at least the vehicle type and the vehicle color of the vehicle VCL1.

The monitoring camera 1 sets a determined camera parameter. Accordingly, the monitoring camera 1 can quickly improve detection accuracy of an object (for example, the vehicle type, the vehicle color, and the numbers of the vehicle VCL1) to be detected by AI, so that the object (for example, the vehicle type, the vehicle color, and the numbers of the vehicle VCL1) to be detected in a captured image can be detected with high accuracy.

When the vehicle VCL1 in the captured image cannot be detected, the monitoring camera 1 determines and sets a camera parameter so that the vehicle VCL1 appearing in the captured image captured by the imaging unit can be detected by AI. Accordingly, when the monitoring camera 1 is installed in an environment where AI cannot detect the vehicle VCL1 at a currently set camera parameter, the monitoring camera 1 can adjust (change) the camera parameter, so that at least the vehicle VCL1 can be detected.

The camera parameter is exposure time of the imaging unit. The monitoring camera 1 determines the exposure time so that a vehicle type, a vehicle color, a vehicle category, or a license plate of the vehicle VCL1 appearing in the captured image captured by the imaging unit can be detected by AI. Accordingly, the monitoring camera 1 brightens the captured image obtained by the image sensor 12 and accurately improves image quality of a feature part (for example, the vehicle type, the vehicle color, the vehicle category, and the numbers) of the subject, so that the monitoring camera 1 can improve detection accuracy of the feature part of the vehicle by AI, and can generate, with high accuracy, a number cut-out image having a brightness to an extent that can be used in a collation processing executed by the collating server 50 using the number blacklist data.

The camera parameter is a gain of the imaging unit. The monitoring camera 1 determines the gain so that the vehicle type, the vehicle color, the vehicle category, or the license plate of the vehicle VCL1 appearing in the captured image captured by the imaging unit can be detected by AI. Accordingly, the monitoring camera 1 relatively increases a brightness of the captured image obtained by the image sensor 12 and accurately improves image quality of a feature part (for example, the vehicle type, the vehicle color, the vehicle category, and the numbers) of the subject, so that the monitoring camera 1 can improve detection accuracy of the feature part of the vehicle by AI, and can generate, with high accuracy, a number cut-out image having a brightness to an extent that can be used in a collation processing executed by the collating server 50 using the number blacklist data.

The camera parameter is a tone curve used to generate a captured image. The monitoring camera 1 determines the tone curve so that the vehicle type, the vehicle color, the vehicle category, or the license plate of the vehicle VCL1 appearing in the captured image captured by the imaging unit can be detected by AI. Accordingly, the monitoring camera 1 relatively increases a brightness of the captured image generated by the processor 14 and accurately improves image quality of a feature part (for example, the vehicle type, the vehicle color, the vehicle category, and the numbers) of the subject, so that the monitoring camera 1 can improve detection accuracy of the feature part of the vehicle by AI, and can generate, with high accuracy, a number cut-out image having a brightness to an extent that can be used in a collation processing executed by the collating server 50 using the number blacklist data.

The camera parameter is a rotation amount of at least one of pan rotation and tilt rotation of the imaging unit. The monitoring camera 1 determines the rotation amount so that the vehicle type, the vehicle color, the vehicle category, or the license plate of the vehicle VCL1 appearing in the captured image captured by the imaging unit can be detected by AI. Accordingly, the monitoring camera 1 can appropriately include the vehicle in an angle of view and can accurately improve detection accuracy of the feature part (for example, the vehicle type, the vehicle color, the vehicle category, and the numbers) of the vehicle by AI.

The camera parameter is a zoom magnification of the imaging unit. The monitoring camera 1 determines the zoom magnification so that the vehicle type, the vehicle color, the vehicle category, or the license plate of the vehicle VCL1 appearing in the captured image captured by the imaging unit can be detected by AI. Accordingly, even when a proportion of the vehicle VCL1 in the captured image is small, the monitoring camera 1 can detect a feature part (for example, the vehicle type, the vehicle color, the vehicle category, and the numbers) of the vehicle VCL1 with high accuracy by AI by increasing the zoom magnification and zooming up.

When the vehicle type or the vehicle color of the vehicle VCL1 and the numbers of the vehicle VCL1 in the captured image captured by the imaging unit are detected by AI after the camera parameters are set, the processor 14 of the monitoring camera 1 collates a number character recognition and a license plate blacklist. Accordingly, the monitoring camera 1 can detect step by step the feature part of the vehicle VCL1 in order of the vehicle type and the vehicle color, and the numbers, so that the monitoring camera 1 can generate the number cut-out image for collating an owner of the vehicle VCL1, and can notify a monitor of details of the vehicle VCL1 entering the imaging area based on a collation result. The monitoring camera 1 can detect step by step the feature part of the vehicle VCL1 in order of the vehicle type and the vehicle color, and the numbers, so that the monitoring camera 1 can generate the number cut-out image for collating an owner of the vehicle VCL1 by the collating server 50, and can notify a monitor of details of the vehicle VCL1 entering the imaging area.

Although various embodiments are described above with reference to the drawings, it is needless to say that the present invention is not limited to the embodiments. It will be apparent to those skilled in the art that various alterations, modifications, substitutions, additions, deletions, and equivalents can be conceived within the scope of the claims, and it should be understood that such changes also belong to the technical scope of the present invention. Components in various embodiments described above may be combined freely in a range without deviating from the spirit of the invention.

The present invention can be used as a monitoring camera, a camera parameter determining method, and a storage medium that adaptively determine a camera parameter contributing to improvement of monitoring accuracy of a face of a person or a feature part of a vehicle appearing in an image of an imaging area, accurately improve image quality of the image, and improve efficiency of a monitoring operation.

What is claimed is:

1. A monitoring camera capable of performing artificial intelligence, the monitoring camera comprising:
   an image sensor configured to capture an image of an imaging area;
   a detector configured to detects a vehicle in the captured image of the imaging area based on the artificial intelligence; and
   a controller configured to determine a camera parameter of the monitoring camera and tone curve feature based on headlights and a moving speed of the vehicle in the captured image.

2. The monitoring camera according to claim 1, wherein the controller sets the camera parameter.

3. The monitoring camera according to claim 1, wherein when the vehicle in the captured image is not detected, the controller determines and sets the camera parameter so that the detector detects the vehicle in the captured image captured by the image sensor.

4. The monitoring camera according to claim 1, wherein the camera parameter is exposure time of the image sensor, and
wherein the controller determines the exposure time so that the detector detects a vehicle type, a vehicle color, a vehicle category, or a license plate of the vehicle in the captured image captured by the image sensor.

5. The monitoring camera according to claim 1, wherein the camera parameter is a gain of the image sensor, and
wherein the controller determines the gain so that the detector detects a vehicle type, a vehicle color, a vehicle category, or a license plate in the captured image captured by the image sensor.

6. The monitoring camera according to claim 1, wherein the camera parameter is a rotation amount of at least of one of pan rotation and tilt rotation of the image sensor, and
wherein the controller determines the rotation amount so that the detector detects a vehicle type, a vehicle color, a vehicle category, or a license plate of the vehicle in the captured image captured by the image sensor.

7. The monitoring camera according to claim 1, wherein the camera parameter is a zoom magnification of the image sensor, and
wherein the controller determines the zoom magnification so that the detector detects a vehicle type, a vehicle color, a vehicle category, or a license plate of the vehicle in the captured image captured by the image sensor.

8. A monitoring camera capable of performing artificial intelligence, the monitoring camera comprising:
an image sensor configured to capture an image of an imaging area;
a detector configured to detect a person in the captured image of the imaging area based on the artificial intelligence; and
a controller configured to determine a position of a face of the person in the captured image and determine a camera parameter of the monitoring camera based on a brightness or a moving speed of the face,
wherein the camera parameter is a tone curve used to generate the captured image, and
wherein the controller determines the tone curve so that the detector detects a vehicle type, a vehicle color, a vehicle category, or a license plate in the captured image captured by the image sensor.

9. A monitoring camera capable of performing artificial intelligence, the monitoring camera comprising:
an image sensor configured to capture an image of an imaging area;
a detector configured to detect a person in the captured image of the imaging area based on the artificial intelligence;
a controller configured to determine a position of a face of the person in the captured image and determine a camera parameter of the monitoring camera based on a brightness or a moving speed of the face;
a communication circuit configured to send a face cut-out image obtained by cutting out the face in the captured image to a face collating server communicably connected with the monitoring camera, when the detector detects the face of the person in the captured image captured by the image sensor after the camera parameter is set and a detection score of the face is equal to or larger than a threshold; and
a character recognition processor configured to recognize the license plate and collates the license plate with a blacklist, when the detector detects the vehicle type or the vehicle color of the vehicle and the license plate of the vehicle in the captured image captured by the image sensor after the camera parameter is set.

10. A camera parameter determining method performed by a monitoring camera performing artificial intelligence, the camera parameter determining method comprising:
capturing an image of an imaging area;
detecting a vehicle in the captured image of the imaging area based on the artificial intelligence; and
determining a camera parameter of the monitoring camera and tone curve feature based on headlights and a moving speed of the vehicle in the captured image.

11. A non-transitory computer-readable recording medium recording a program for causing a computer to execute the camera parameter determining method set forth in claim 10.

* * * * *